(12) United States Patent
Kim

(10) Patent No.: US 8,464,284 B2
(45) Date of Patent: Jun. 11, 2013

(54) DISK ROTATION DEVICE

(75) Inventor: Yongjoo Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 74 days.

(21) Appl. No.: 13/162,207

(22) Filed: Jun. 16, 2011

(65) Prior Publication Data

US 2011/0311176 A1 Dec. 22, 2011

(30) Foreign Application Priority Data

Jun. 16, 2010 (KR) .................. 10-2010-0057250

(51) Int. Cl.
*G11B 19/20* (2006.01)
(52) U.S. Cl.
USPC ........................................ 720/702
(58) Field of Classification Search
USPC ........................................ 720/702
See application file for complete search history.

(56) References Cited

U.S. PATENT DOCUMENTS

| | | | | |
|---|---|---|---|---|
| 6,333,912 | B1* | 12/2001 | Sohn | 720/702 |
| 6,477,133 | B1* | 11/2002 | Yoshimura et al. | 720/702 |
| 7,434,240 | B2* | 10/2008 | Yoo et al. | 720/702 |
| 7,814,506 | B2* | 10/2010 | Kim | 720/702 |
| 7,917,918 | B2* | 3/2011 | Ito et al. | 720/706 |
| 8,166,496 | B2* | 4/2012 | Yoo | 720/702 |
| 2009/0307717 | A1* | 12/2009 | Yoo | 720/702 |
| 2011/0119692 | A1* | 5/2011 | Ito et al. | 720/702 |

* cited by examiner

*Primary Examiner* — Mark Blouin
(74) *Attorney, Agent, or Firm* — Saliwanchik, Lloyd & Eisenschenk

(57) ABSTRACT

A disk rotation device is provided, the device including: a bearing assembly including a bearing formed with a rotation shaft hole and a bearing housing that accommodates the bearing; a stator including a core secured at a periphery of the bearing housing and a coil wound on the core; a rotation shaft coupled to the rotation shaft hole; a rotor including a yoke secured at the rotation shaft and a magnet arranged at an inner lateral surface of the yoke facing a distal end of the core; and a turn table including a turn table body coupled to the rotation shaft, balls accommodated inside a circular trench of the turn table body and a cover member that blocks the trench, wherein a curve that line-contacts the balls is formed at an area where an inner lateral surface of the trench and a floor surface connected to the inner lateral surface of the trench meets.

18 Claims, 6 Drawing Sheets

DISK ROTATION DEVICE

CROSS-REFERENCE TO RELATED APPLICATION

This application claims the benefit under 35 U.S.C. §119 of Korean Patent Application No. 10-2010-0057250, filed Jun. 16, 2010, which is hereby incorporated by reference in its entirety.

BACKGROUND OF THE DISCLOSURE

1. Field of the Invention

The present disclosure relates to a disk rotation device.

2. Description of Related Art

Generally, a disk rotation device is used to rotate a disk such as an optical disk drive (ODD) or a hard disk at a high speed. The disk rotation device includes a spindle motor for rotating a disk at a high speed and a turn table coupled to a rotation shaft of the spindle motor to accommodate the disk.

Recently, a turn table is widely used with an ABS (Automatic Balancing System) that is arranged with balls inside a round groove formed underneath the turn table to reduce vibration caused by a rotation shaft and eccentricity generated by the turn table. The ball arranged inside the round groove is positioned on an area exactly opposite to an eccentric area to reduce the vibration caused by the eccentricity.

The disk rotation device including a turn table formed with an ABS makes no big problems when in horizontal state, but generates noise and vibration due to the turn table and balls that collide with an inner lateral surface of the round groove when in vertical state relative to ground.

BRIEF SUMMARY

Exemplary embodiments of the present disclosure provide a disk rotation device configured to inhibit generation of noise and vibration caused by contact between a turn table and balls when the turn table laid thereon with a disk is aligned in a horizontal state, an inclined state or a vertical state relative to a lying surface.

In one general aspect of the present disclosure, there is provided a disk rotation device, the device comprising: a bearing assembly including a bearing formed with a rotation shaft hole and a bearing housing that accommodates the bearing; a stator including a core secured at a periphery of the bearing housing and a coil wound on the core; a rotation shaft coupled to the rotation shaft hole; a rotor including a yoke secured at the rotation shaft and a magnet arranged at an inner lateral surface of the yoke facing a distal end of the core; and a turn table including a turn table body coupled to the rotation shaft, balls accommodated inside a circular trench of the turn table body and a cover member that blocks the trench, wherein a curve that line-contacts the balls is formed at an area where an inner lateral surface of the trench and a floor surface connected to the inner lateral surface of the trench meets.

In another general aspect of the present disclosure, there is provided a disk rotation device, the device comprising: a bearing assembly including a bearing formed with a rotation shaft hole and a bearing housing that accommodates the bearing; a stator including a core secured at a periphery of the bearing housing and a coil wound on the core; a rotation shaft coupled to the rotation shaft hole; a rotor including a yoke secured at the rotation shaft and a magnet arranged at an inner lateral surface of the yoke; and a turn table including a disk-like turn table body coupled to the rotation shaft, balls accommodated inside a circular trench of the turn table body and a cover member that blocks the circular trench, wherein a concave curve is formed at a floor surface formed by the trench.

In still another general aspect of the present disclosure, there is provided a disk rotation device, the device comprising: a bearing assembly including a bearing formed with a rotation shaft hole and a bearing housing that accommodates the bearing; a stator including a core secured at a periphery of the bearing housing and a coil wound on the core; a rotation shaft coupled to the rotation shaft hole; a rotor including a yoke secured at the rotation shaft and a magnet arranged at an inner lateral surface of the yoke; a turn table including a turn table body coupled to the rotation shaft, balls accommodated inside a circular trench of the turn table body and a cover member that blocks the circular trench; and a slip inhibition member arranged along an inner lateral surface of the trench and a floor surface connected to the inner lateral surface of the trench to line-contact the balls.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

Accompanying drawings are included to provide a further understanding of arrangements and embodiments of the present disclosure and are incorporated in and constitute a part of this application. In the following drawings, like reference numerals refer to like elements and wherein.

DETAILED DESCRIPTION

Figure 1:
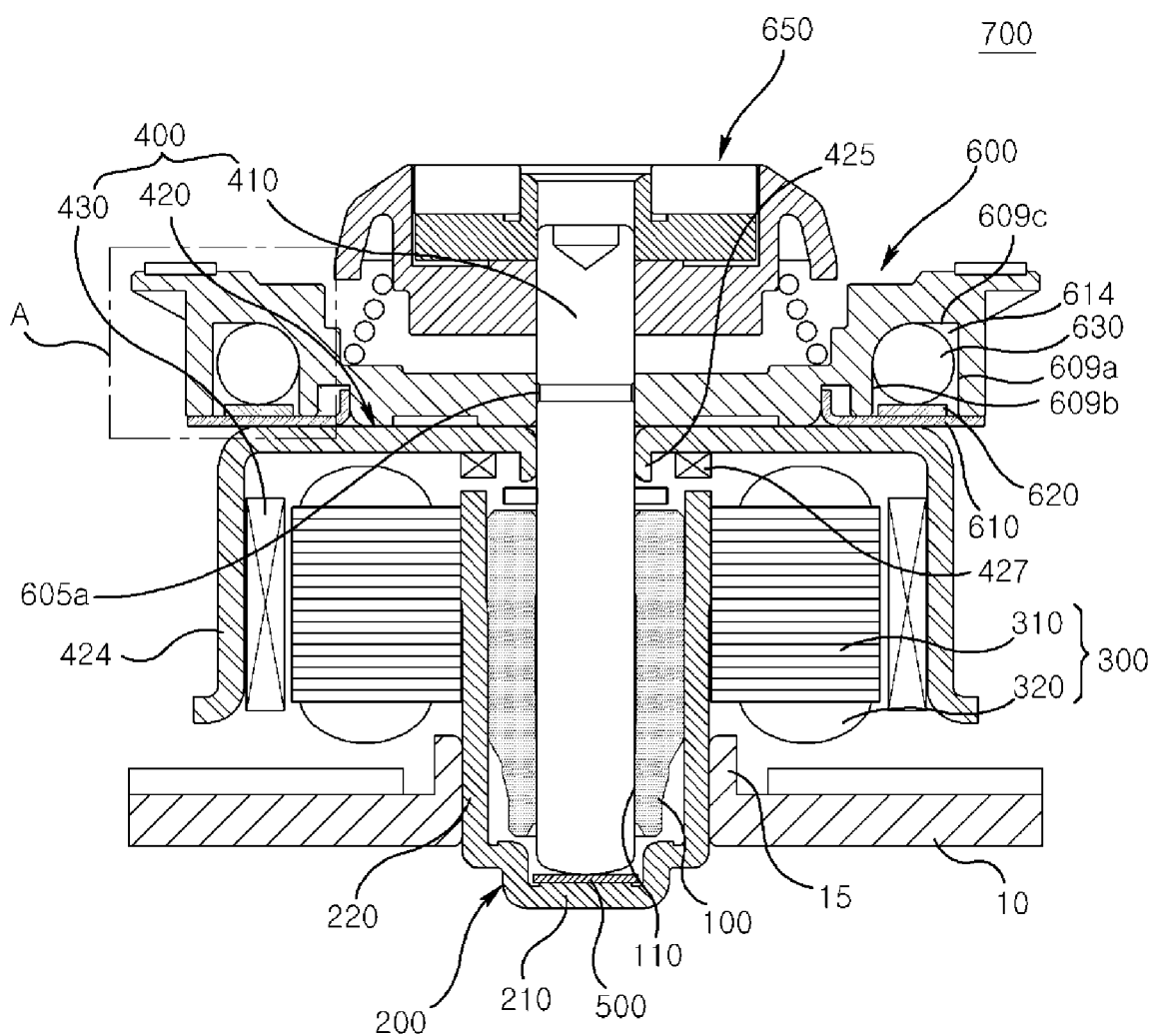
FIG. 1 is a cross-sectional view illustrating a disk rotation device according to a first exemplary embodiment of the present disclosure.

Hereinafter, exemplary embodiments of the present disclosure are described in detail with reference to the accompanying drawings. In the drawings, sizes or shapes of constituent elements may be exaggerated for clarity and convenience.

Particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification. The meaning will be clear from the context of the description. Like numbers refer to like elements throughout, and explanations that duplicate one another will be omitted.

First Exemplary Embodiment FIG. 1 is a cross-sectional view illustrating a disk rotation device according to a first exemplary embodiment of the present disclosure, and FIG. 2 is an enlarged view of 'A' part illustrated in FIG. 1.

Figure 2:
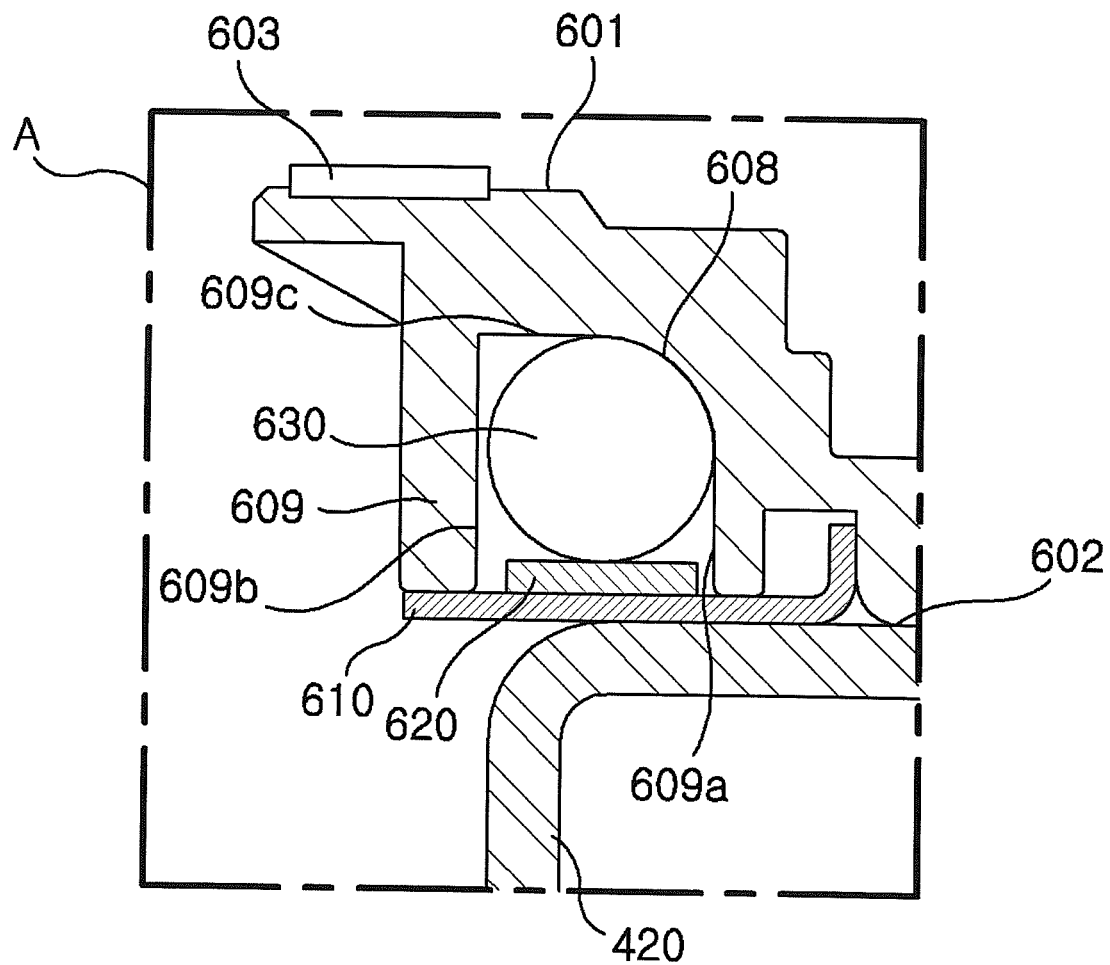
FIG. 2 is an enlarged view of 'A' part illustrated in FIG. 1.

Referring to FIGS. 1 and 2, a spindle motor (700) includes a bearing (100) a bearing housing (200), a stator (300), a rotor (400) and a turn table (600). The spindle motor may further include a base (10) securing the bearing housing (200), a thrust bearing (500) reducing noise and vibration caused by the rotor (400), and a center cone (650).

The bearing (100) takes the shape of a cylinder formed with a rotation shaft hole (110). The bearing (100) may include an oil impregnation sintered bearing for rotating the rotor (400, described later) at a high speed.

The bearing housing (200) takes the shape of an upper distal end-opened barrel, and includes a floor plate (210) and a lateral wall (220). The floor plate (210) takes the shape of a disk, for example, and is arranged with the thrust bearing (500). The lateral wall (220) is to store the bearing (100) and is extended from the floor plate (210) along a periphery of the bearing (100).

Thus, in the first exemplary embodiment of the present disclosure, the lateral wall takes the shape of a cylinder, where the bearing (100) is inserted into the lateral wall (220). The bearing (100) may be press-fitted into the bearing housing (200) to inhibit from rotating from the bearing housing (200).

The stator (300) includes a core (310) and a coil (320). The core (310) is formed by stacking with a plurality of iron pieces, each piece having an opening. The core (310) is secured to a periphery of the bearing housing (200) by being inserted thereinto.

The coil (320) is wound on the core (310) using a winding unit (not shown) formed at the core (310).

The rotor (400) includes a rotation shaft (410), a yoke (420) and a magnet (430). The rotation shaft (410) is rotatably inserted into a rotation shaft hole (110) of the bearing (100). The rotation shaft (410) is processed at a bottom distal end with a curvature to spot-contact the thrust bearing (500) arranged on the floor plate (210) of the bearing housing (200).

The yoke (420) includes a disk-shaped yoke upper plate (422) and a yoke skirt unit (424) so bent from the yoke upper plate (422) as to face a lateral surface of the core (310). The yoke upper plate (422) is centrally formed with a yoke burring unit (425) inserted through an upper distal end of the rotation shaft (410) and press-fitted into the rotation shaft (410). The yoke upper plate (422) is arranged at an inner lateral surface with a suction magnet (427) that operates in association with the bearing (100).

The magnet (430) is arranged at an inner lateral surface of the yoke skirt unit (424), where the rotor (400) is rotated at a high speed relative to the stator by a magnetic field generated by the magnet (430) and a magnet generated by the coil (320) wound on the core (310).

The base (10) takes the shape of a plate, and is centrally formed with a base burring unit (15) press-fitted into the lateral wall (220) of the bearing housing (200).

The turn table (600) is arranged on the yoke upper plate (422) of yoke (420), and is coupled to the rotation shaft (410).

The turn table (600) includes a turn table body (605), a trench (609), a cover member (610) and a ball (630).

The turn table body (605) takes a disk-like shape and includes an upper surface (601) on which a disk is accommodated, and a bottom surface (602) facing the upper surface (601). The turn table body (605) includes a through hole (605a) that passes the upper surface (601) and the bottom surface (602), and the through hole (605a) is formed at a rotation center of the turn table body (605).

The through hole (605a) of the turn table body (605) is press-fitted by the rotation shaft (410), whereby the turn table body (605) rotates with the rotation shaft (410).

An edge of the upper surface (601) of the turn table body (605) is arranged with a felt (603) for inhibiting the disk from slipping. The felt (603) takes the shape of a circular belt when viewed in a top plan view.

The trench (609) is formed from the bottom surface (602) of the turn table body (605) to the upper surface (601) of the turn table body (605), for example. The trench (609) is coaxially arranged with the through hole (605a) of the turn table body (605), and takes the shape of a circle when viewed in a top view.

In the present first exemplary embodiment of the present disclosure, the trench (609) includes a first inner lateral surface (609a), a second inner lateral surface (609b) and a floor surface (609c). The first inner lateral surface (609a) is arranged adjacent to the through hole (605a), the second inner lateral surface (609b) is arranged opposite to the first inner lateral surface (609a), and the floor surface (609c) is connected to the first and second inner lateral surfaces (609a, 609b).

The trench (609) is formed therein with balls (630). In the present first exemplary embodiment of the present disclosure, three to ten balls (630) are accommodated inside the trench (609), for example. The balls (630) are rotated along the trench (609), and arranged at areas opposite to an eccentric unit of the turn table body (605) to compensate eccentricity of the turn table body (605).

The cover member (610) covers the trench (609) to inhibit the balls accommodated in the trench (609) from being disengaged from the turn table body (605). The cover member (610) may take the shape of a doughnut when viewed in a top plan view. The cover member (610) is arranged at an inner lateral surface with a circular felt (620) having a predetermined frictional force.

Meanwhile, in a case the disk rotation device (700) is slantingly or vertically arranged relative to ground, the balls (630) accommodated in the trench of the turn table body (605) collide with the first and second inner lateral surfaces (609a, 609b) to generate noise and/or vibration.

Referring to FIG. 2, an area is formed with a curve unit (608) that line-contacts a surface of the ball (630), the area being where the first inner lateral surface (609a) of the turn table body (605) and the floor surface (606) of the turn table body (605) are met.

The curve unit (608) is formed at an area where the first inner lateral surface (609a) and the floor surface (609c) meet, and curvature of the curve unit (609) is substantially same as that of the ball (630).

In the present first exemplary embodiment of the present disclosure, the curve unit (608) may be formed at a part of the first inner lateral surface (609a) and at a part of the floor surface (609c).

Thus, the noise and vibration generated by contact between the ball (630) and the turn table body (605) can be prevented or obviated in part or in whole, as the curve unit (608) having a curvature line-contacting the ball (630) is formed at the first inner lateral surface (609a) of the turn table body (605) and at the floor surface (609c).

Second Exemplary Embodiment

Figure 3:
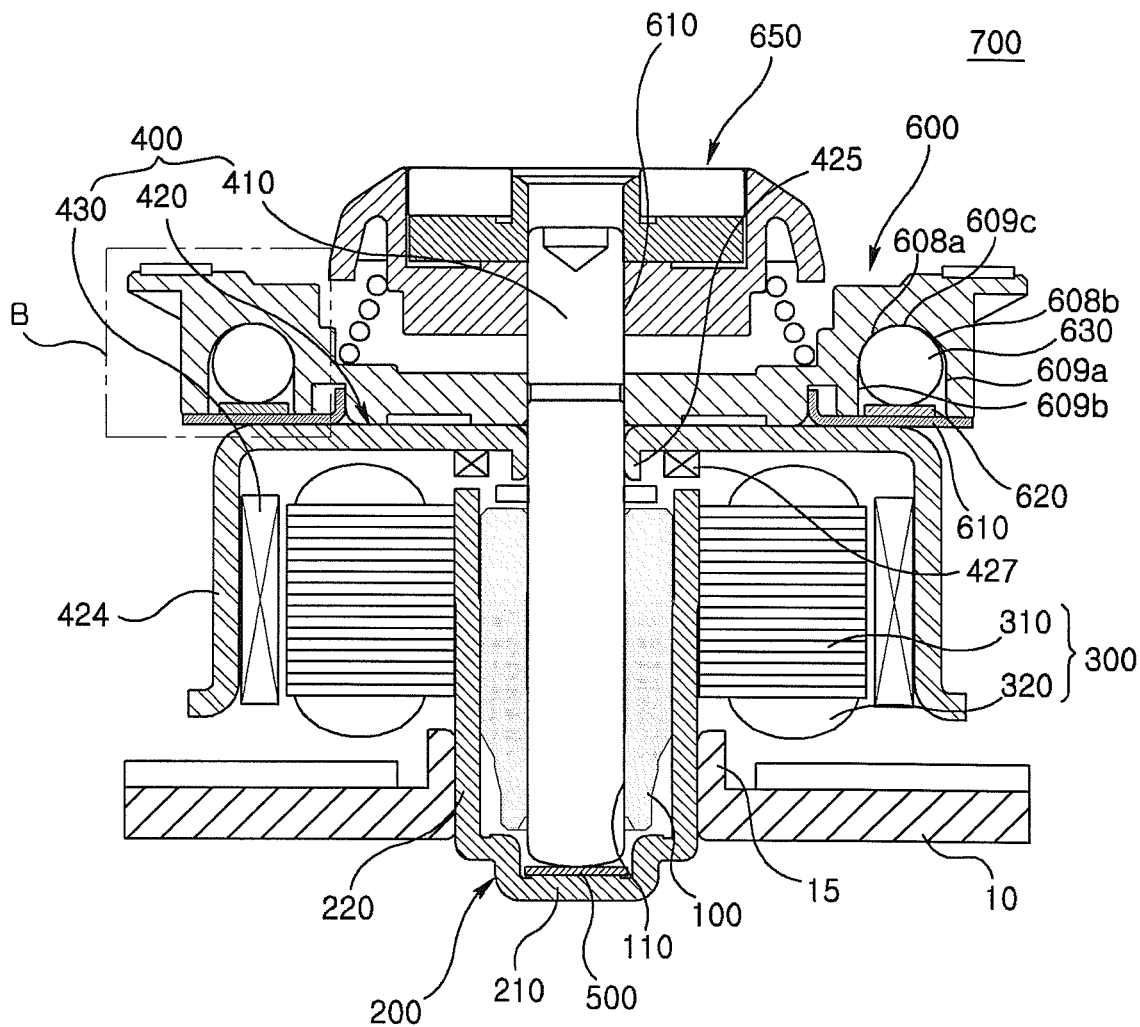
FIG. 3 is a cross-sectional view illustrating a disk rotation device according to a second exemplary embodiment of the present disclosure.
Figure 4:
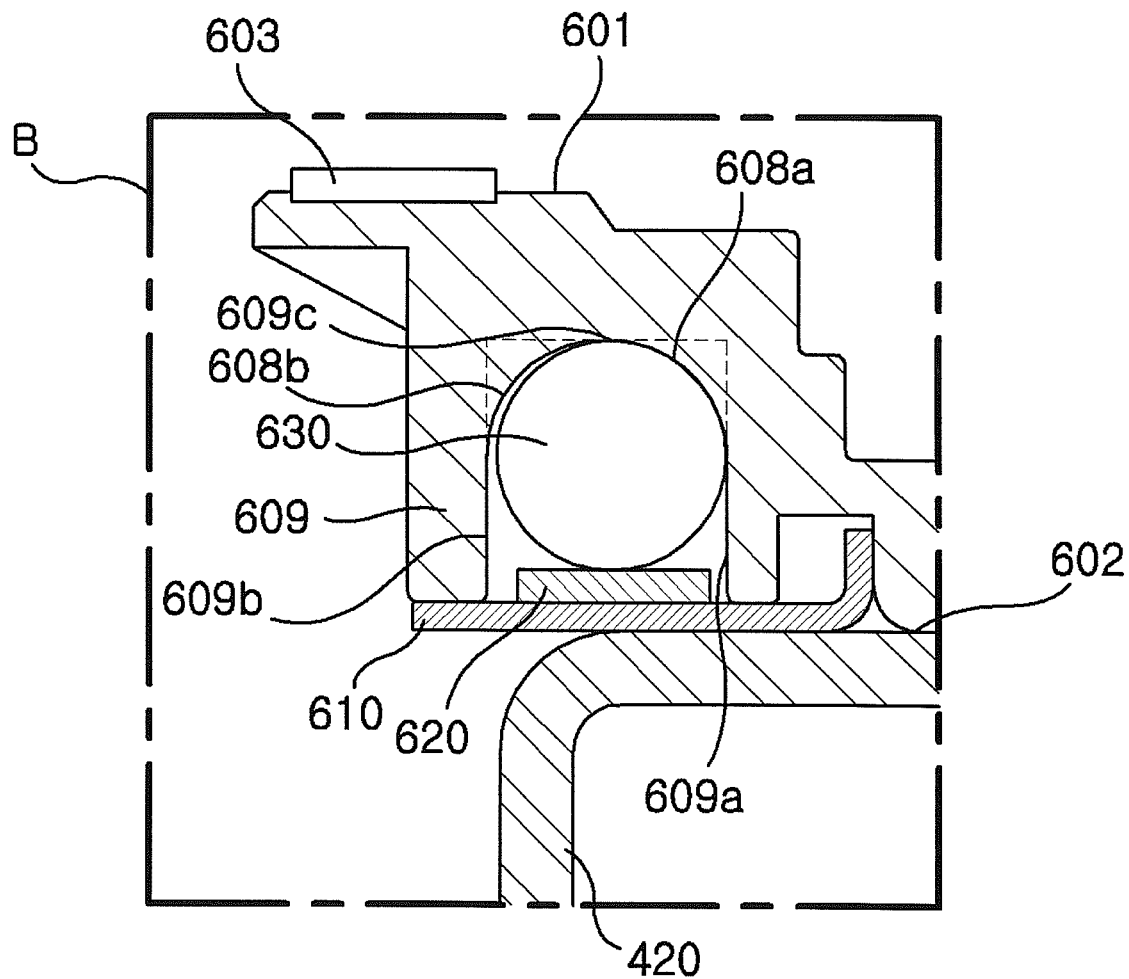
FIG. 4 is an enlarged view of 'B' part illustrated in FIG. 3.

FIG. 3 is a cross-sectional view illustrating a disk rotation device according to a second exemplary embodiment of the present disclosure, and FIG. 4 is an enlarged view of 'B' part illustrated in FIG. 3.

The disk rotation device according to the second exemplary embodiment of the present disclosure is substantially same, configuration-wise, except for the turn table, as that illustrated in FIGS. 1 and 2, such that it should be noted that explanations that duplicate one another are omitted, and like reference numerals refer to like elements throughout.

Referring to FIGS. 3 and 4, a spindle motor (700) includes a bearing (100) a bearing housing (200), a stator (300), a rotor (400) and a turn table (600). The spindle motor may further include a base (10) securing the bearing housing (200), a thrust bearing (500) reducing noise and vibration caused by the rotor (400), and a center cone (650).

The floor surface (609c) of the trench (609) formed at the turn table body (605) of the turn table (600) is formed with concave curve units (608a, 608b). Hereinafter, the concave curve units (608a, 608b) formed at the floor surface (609c) of trench (609) at the turn table body (605) are respectively defined as first and second curved units (608a, 608b).

The first curved unit (608a) is formed at an area where the first inner lateral surface (609a) of the turn table body (605) and the floor surface (609c) of the turn table body (605) are met, to reduce or restrain generation of noise and/or vibration caused by the balls (630).

The second curved unit (608b) is formed at an area where the second inner lateral surface (609b) of the turn table body (605) and the floor surface (609c) of the turn table body (605) are met, to reduce or restrain generation of noise and/or vibration caused by the balls (630).

In the present second exemplary embodiment of the present disclosure, the curvature of the first curved unit (608a) is substantially same as that of the ball (630), such that the first curved unit (608a) and the surface of the ball (630) are line-contacted. Meanwhile, the present second exemplary embodiment of the present disclosure, the curvature of the first curved unit (608a) may be different from that of the second curve unit (608b). Alternatively, the curvature of the first curved unit (608a) may be same as that of the second curve unit (608b).

Thus, in the second exemplary embodiment of the present disclosure, excessive noise and vibration generated by contact between the ball (630) and the turn table body (605) can be prevented or obviated in part or in whole by formation of the first curved unit (608a) having a curvature line-contacting the surface of the ball (630) at the first inner lateral surface (609a) of the turn table body (605) and at the floor surface (609c), and by formation of second curve unit (608b) at the second inner lateral surface (609b) and at the floor surface (609c).

Third Exemplary Embodiment

Figure 5:
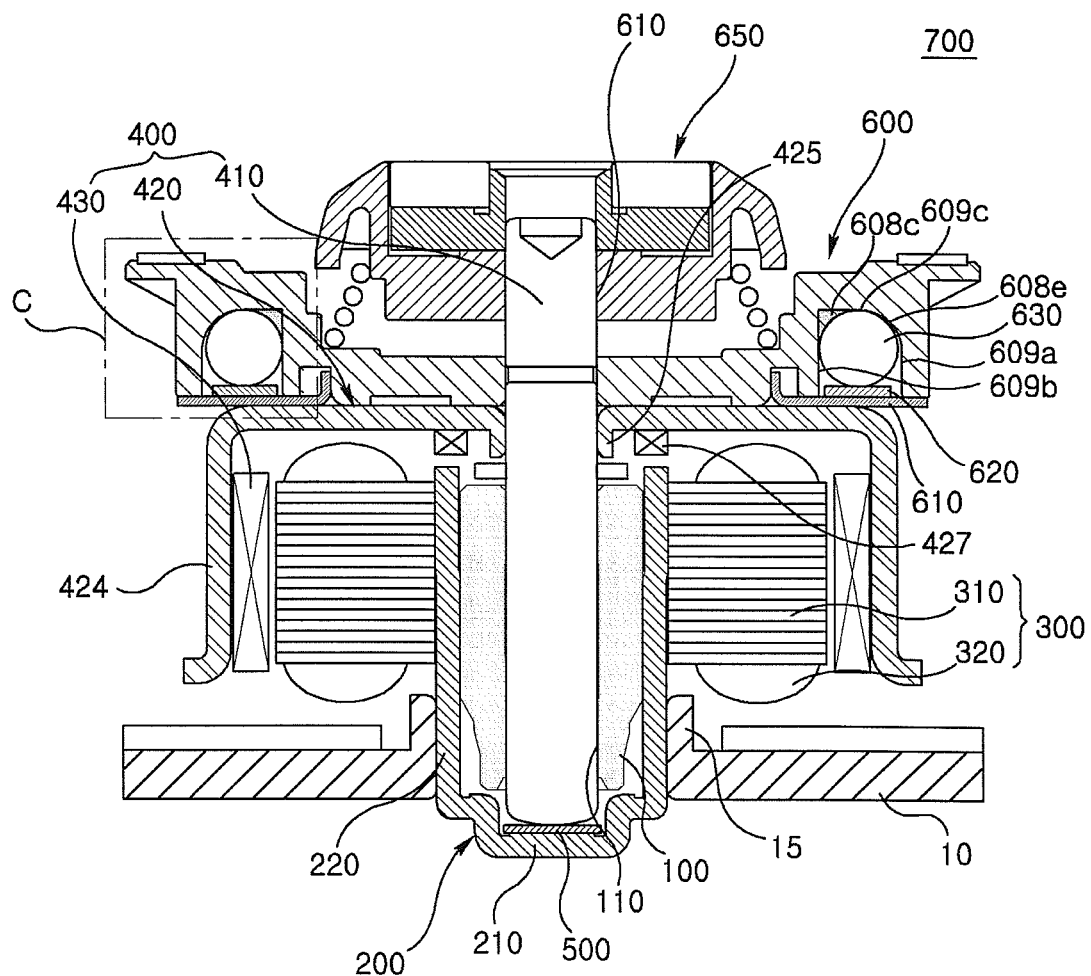
FIG. 5 is a cross-sectional view illustrating a disk rotation device according to a third exemplary embodiment of the present disclosure.
Figure 6:
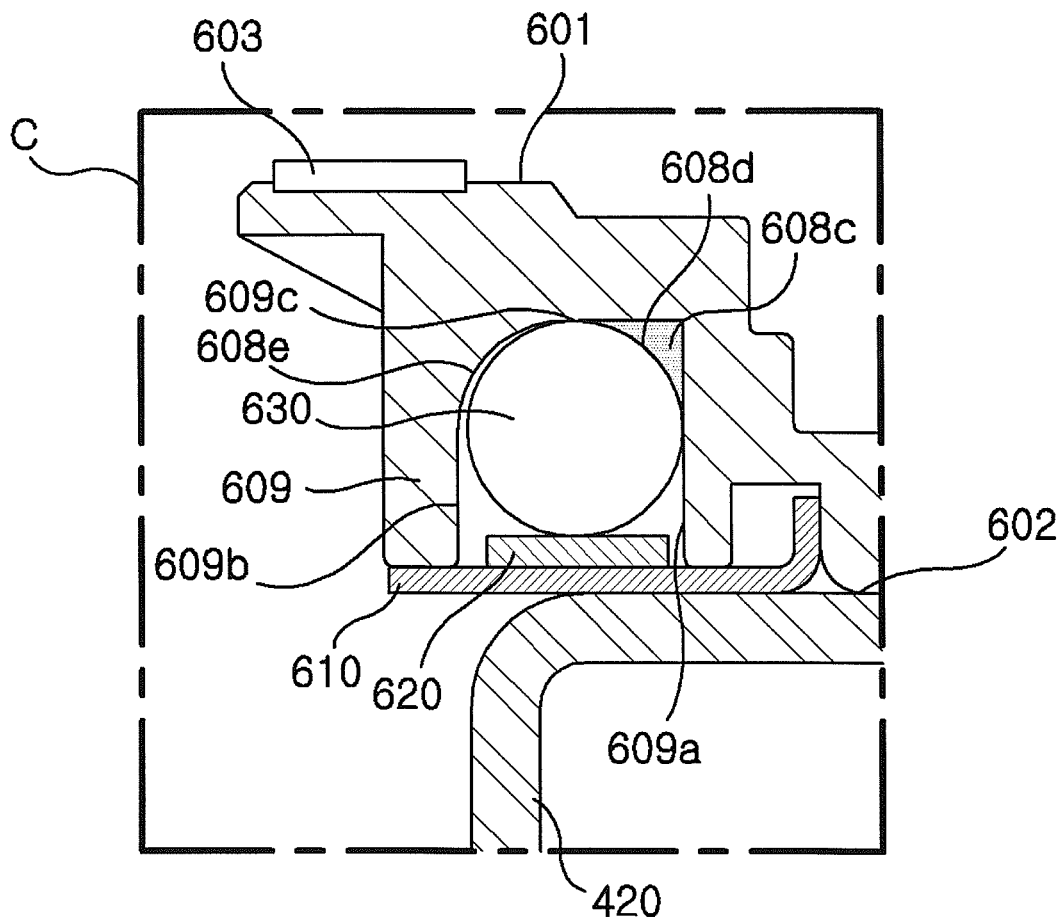
FIG. 6 is an enlarged view of 'C' part illustrated in FIG. 5.
Figure 7:
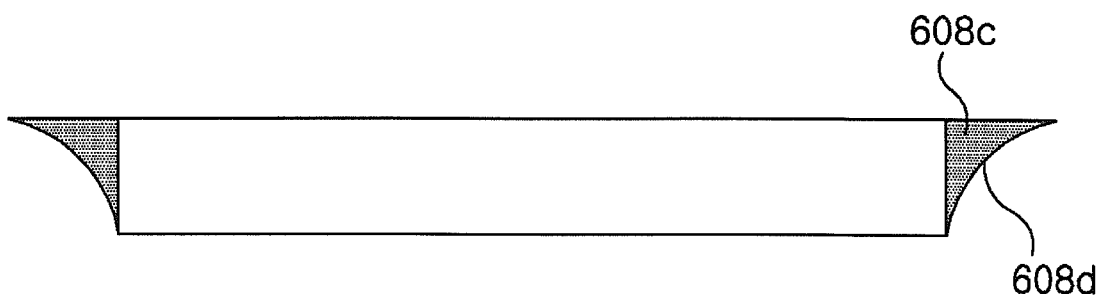
FIG. 7 is a cross-sectional view illustrating a slip inhibition member illustrated in FIG. 5.

FIG. 5 is a cross-sectional view illustrating a disk rotation device according to a third exemplary embodiment of the present disclosure, FIG. 6 is an enlarged view of 'C' part illustrated in FIG. 5, and FIG. 7 is a cross-sectional view illustrating a slip inhibition member illustrated in FIG. 5.

The disk rotation device according to the third exemplary embodiment of the present disclosure is substantially same, configuration-wise, except for the turn table, as that illustrated in FIGS. 1 and 2, such that it should be noted that explanations that duplicate one another are omitted, and like reference numerals refer to like elements throughout.

Referring to FIGS. 5, 6 and 7, a spindle motor (700) includes a bearing (100) a bearing housing (200), a stator (300), a rotor (400) and a turn table (600). The spindle motor may further include a base (10) securing the bearing housing (200), a thrust bearing (500) reducing noise and vibration caused by the rotor (400), and a center cone (650).

The turn table body (605) of the turn table (600) includes a trench (609) that further includes first and second inner lateral surfaces (609a, 609b) and a floor surface (609c), and the first and second inner lateral surfaces (609a, 609b) and the floor surface (609c) may be mutually perpendicularly formed.

The first and second inner lateral surfaces (609a, 609b) may be formed with a slip inhibition unit (608c) as shown in FIG. 7. The slip inhibition unit (608c) takes the shape of a circle, and a part of the slip inhibition unit (608c) that contacts the ball (630) is formed with a concave curved surface (608d). The concave curved surface (608d) line-contacts the ball (630) to inhibit generation of noise and/or vibration generated by mutual collision of balls (630) or collision between the ball (630) and the turn table body (605), when the disk rotation device (700) is driven by being perpendicularly erected relative to the ground.

Meanwhile, a curved unit (608e) may be formed at an area where the turn table body (605), the second inner lateral surface (609b) and the floor surface (609c) are met.

In the third exemplary embodiment of the present disclosure, the slip inhibition unit (608c) may include a substantially same material as that of the turn table (600). Alternatively, the slip inhibition unit (608c) may include a different material as that of the turn table (600), i.e., an elastic member having elasticity.

Although the third exemplary embodiment of the present disclosure has described and illustrated a configuration where the slip inhibition unit (608c) is selectively formed at an area where the first inner lateral surface (609a) and the floor surface (609c) are met, it should be apparent that the slip inhibition unit may be additionally arranged at an area where the second inner lateral surface (609b) and the floor surface (609c) are met.

Thus, in the third exemplary embodiment of the present disclosure, excessive noise and vibration generated by contact between the ball (630) and the turn table body (605) can be prevented or obviated in part or in whole by formation of the slip inhibition unit (608c) having a curvature line-contacting the surface of the ball (630) at the first inner lateral surface (609a) of the turn table body (605) and at the floor surface (609c).

As apparent from the foregoing, the disk rotation device according to the present disclosure has an industrial applicability and advantageous effect in that vibration generated by a ball embedded in a turn table that rotates a disk at a high speed and the turn table can be reduced or restricted to prevent or obviate in whole or in part a data read error of the disk and a data write error of the disk.

Any reference in this specification to "one embodiment," "an embodiment," "exemplary embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A disk rotation device, the device comprising:
    a bearing assembly including a bearing formed with a rotation shaft hole and a bearing housing that accommodates the bearing;
    a stator including a core secured at a periphery of the bearing housing and a coil wound on the core;
    a rotation shaft coupled to the rotation shaft hole;
    a rotor including a yoke secured at the rotation shaft and a magnet arranged at an inner lateral surface of the yoke facing a distal end of the core; and
    a turn table including a turn table body, which has a through hole, coupled to the rotation shaft, balls accommodated inside a circular trench of the turn table body and a cover member that blocks the trench,
    wherein a curve that line-contacts the balls is formed at an area where an inner lateral surface, which is arranged adjacent to the through hole, of the trench and a floor surface connected to the inner lateral surface of the trench meet and the floor surface is an upper surface of the trench so as to inhibit generation of noise and vibration, in case the turn table is aligned in a horizontal state, an inclined state, or a vertical state relative to a lying surface.

2. The device of claim 1, wherein a curvature of the curve is same as that of the ball.

3. The device of claim 1, wherein a circular felt member is formed at an inner lateral surface of the cover member contacting the ball.

4. A disk rotation device, the device comprising:
    a bearing assembly including a bearing formed with a rotation shaft hole and a bearing housing that accommodates the bearing;
    a stator including a core secured at a periphery of the bearing housing and a coil wound on the core;
    a rotation shaft coupled to the rotation shaft hole;
    a rotor including a yoke secured at the rotation shaft and a magnet arranged at an inner lateral surface of the yoke; and a turn table including a disk-like turn table body coupled to the rotation shaft, balls accommodated inside a circular trench of the turn table body and a cover member that blocks the circular trench,
    wherein a concave curve is formed at a floor surface formed by the trench and the floor surface is an upper surface of the trench so as to inhibit generation of noise and vibration, in case the turn table is aligned in a horizontal state, an inclined state, or a vertical state relative to a lying surface.

5. The device of claim 4, wherein the curve includes a first curve formed at a first inner lateral surface adjacent to the rotation shaft and at an area met by the floor surface, and a second curve formed at a second inner lateral surface facing the first inner lateral surface and at the area met by the floor surface.

6. The device of claim 5, wherein each of the first and second curves has a different curvature.

7. The device of claim 5, wherein each of the first and second curves has a same curvature.

8. The device of claim 5, wherein a curvature of the curve is same as that of the ball.

9. The device of claim 4, wherein a circular felt member is formed at an inner lateral surface of the cover member contacting the ball.

10. The device of claim 4, wherein at least a part of the curve has a same curvature as that of the ball.

11. A disk rotation device, the device comprising:
    a bearing assembly including a bearing formed with a rotation shaft hole and a bearing housing that accommodates the bearing;
    a stator including a core secured at a periphery of the bearing housing and a coil wound on the core;
    a rotation shaft coupled to the rotation shaft hole; a rotor including a yoke secured at the rotation shaft and a magnet arranged at an inner lateral surface of the yoke;
    a turn table including a turn table body, which has a through hole, coupled to the rotation shaft, balls accommodated inside a circular trench of the turn table body and a cover member that blocks the circular trench; and a slip inhibition member arranged along an inner lateral surface, which is arranged adjacent to the through hole, of the trench and a floor surface connected to the inner lateral surface of the trench to line-contact the balls so as to inhibit generation of noise and vibration, in case the turn table is aligned in a horizontal state, an inclined state, or a vertical state relative to a lying surface,
    wherein the floor surface is an upper surface of the trench.

12. The device of claim 11, wherein an area that line-contact the balls in the slip inhibition member includes a curve formed with a curvature that is same as that of the ball.

13. The device of claim 11, wherein a curve is formed at an area met by an inner lateral surface facing the inner lateral surface of the trench arranged adjacent to the through hole, and the floor surface.

14. The device of claim 11, wherein the slip prevention member is formed with same material as that of the turn table body.

15. The device of claim 11, wherein the slip inhibition member is circularly formed.

16. The device of claim 11, wherein the slip inhibition member includes an elastic material.

17. The device of claim 11, wherein an inner lateral surface of the cover member contacting the balls is arranged with a circular felt member.

18. The device of claim 11, wherein the inner lateral surface and the floor surface are perpendicularly arranged.

* * * * *